(12) United States Patent
Weng et al.

(10) Patent No.: US 7,759,912 B2
(45) Date of Patent: Jul. 20, 2010

(54) ADAPTIVE COMPENSATION SCHEME FOR LC CIRCUITS IN FEEDBACK LOOPS

(75) Inventors: Matthew Weng, San Ramon, CA (US); Charles Vinn, Milpitas, CA (US)

(73) Assignee: Micrel, Inc., San Jose, CA (US)

( * ) Notice: Subject to any disclaimer, the term of this patent is extended or adjusted under 35 U.S.C. 154(b) by 323 days.

(21) Appl. No.: 12/119,791

(22) Filed: May 13, 2008

(65) Prior Publication Data
US 2009/0284235 A1 Nov. 19, 2009

(51) Int. Cl.
*G05F 1/00* (2006.01)
(52) U.S. Cl. .................. 323/222; 323/282
(58) Field of Classification Search .......... 323/222, 323/232, 242, 271, 272, 282, 283, 284, 285
See application file for complete search history.

(56) References Cited

U.S. PATENT DOCUMENTS

| | | | | |
|---|---|---|---|---|
| 5,278,490 A | * | 1/1994 | Smedley | ............ 323/284 |
| 5,617,306 A | * | 4/1997 | Lai et al. | ............ 363/17 |
| 6,531,854 B2 | * | 3/2003 | Hwang | ............ 323/285 |
| 6,963,190 B2 | * | 11/2005 | Asanuma et al. | ............ 323/283 |
| 7,170,264 B1 | * | 1/2007 | Galinski | ............ 323/222 |

* cited by examiner

*Primary Examiner*—Bao Q Vu
*Assistant Examiner*—Nguyen Tran
(74) *Attorney, Agent, or Firm*—Patent Law Group LLP; Carmen C. Cook

(57) ABSTRACT

A method for providing adaptive compensation for an electrical circuit where the electrical circuit includes an inductor-capacitor network connected in a feedback loop being compensated by a first compensation capacitance value and a second compensation capacitance value defining the frequency locations of two compensation zeros includes: measuring the inductance value of the inductor; when the inductance value is greater than a first threshold value, increasing the first and second compensation capacitance values so that the frequency locations of the two compensation zeros are adjusted for compensating the poles introduced by the first inductor and the first capacitor; and when the inductance value is less than the first threshold value, decreasing the first and second compensation capacitance values so that the frequency locations of the two compensation zeros are adjusted for compensating the poles introduced by the first inductor and the first capacitor.

19 Claims, 5 Drawing Sheets

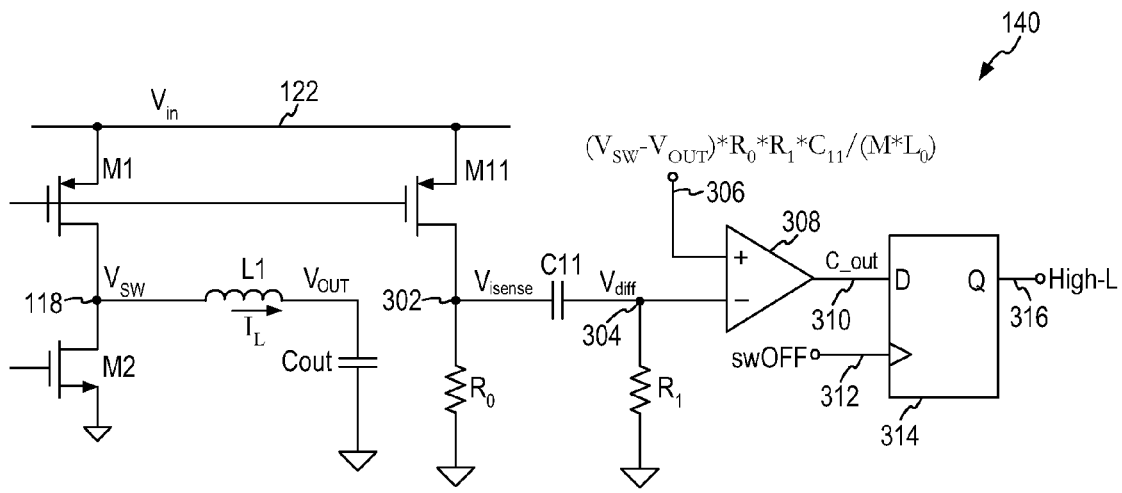
Fig. 7
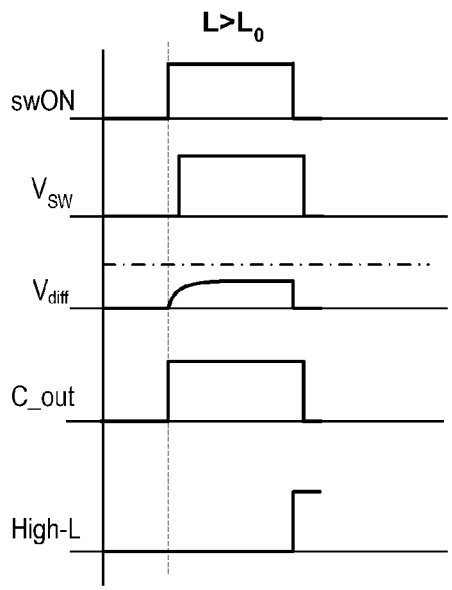
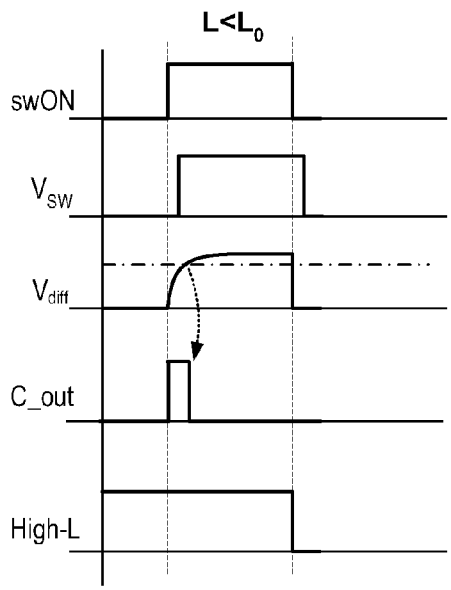
Fig. 8A  Fig. 8B

ADAPTIVE COMPENSATION SCHEME FOR LC CIRCUITS IN FEEDBACK LOOPS

FIELD OF THE INVENTION

The invention relates to a circuit and method for providing compensation to a linear integrated circuit, in particular, to a circuit and method for providing adaptive compensation for the LC circuit in a switching regulator.

DESCRIPTION OF THE RELATED ART

Closed loop negative feedback systems are commonly employed in linear integrated circuits. For instance, switching regulators use a feedback loop to monitor the output voltage in order to provide regulation. To ensure stability in any closed loop system, the Nyquist criterion must be met. The Nyquist criterion states that a closed loop system is stable if the phase shift around the loop is less than 180 degrees at unity gain. Typically, a compensation circuit is added to a feedback loop to modulate the phase shift of the feedback loop to obtain stability.

The frequency response of a linear circuit can be characterized by the presence of "poles" and "zeros." A "pole" is a mathematical term which signifies the complex frequency at which gain reduction begins. On the other hand, a "zero" signifies the complex frequency at which gain increase starts. Poles and zeros on the left half plane of a complex frequency plane or s-plane are considered normal and can be compensated. However, poles and zeros on the right half plane of a complex frequency plane are usually problematic and difficult to manipulate and is not addressed in the present application. Generally, a pole contributes a −90° phase shift while a zero contributes a +90° phase shift. A pole cancels out the phase shift of a zero for zeros in the left half plane. In designing a closed loop system with compensation, the location of the poles and zeros are manipulated so as to avoid a greater than 180° phase shift at unity gain.

In a linear circuit, poles are created by placing a small capacitor on a node with a high dynamic impedance. If the capacitor is placed at a gain stage, the capacitance can be multiplied by the gain of the stage to increase its effectiveness. Each pole has a zero associated with it. That is, at some point, the dynamic resistance of the gain stage will limit the gain loss capable of being achieved by the capacitor. Thus, a zero can be created by placing a resistor in series with the gain reduction capacitor.

DC voltage regulators or switching regulators operate to convert energy from one DC voltage level to another DC voltage level. A switching regulator, sometimes referred to as a switching mode power supply, provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

The operation of the switching regulator is well known and is generalized as follows. A power switch is turned on to apply energy to an inductor of the output filter circuit to allow the current through the inductor to build up. When the power switch is turned off, the voltage across the inductor reverses and charges are transferred onto an output capacitor of the output filter circuit and the load. A relatively constant output voltage is maintained by the output capacitor. A second power switch is sometimes used for synchronous control operation.

Many electrical circuits, such as voltage mode switching regulators, use an inductor-capacitor (LC) network for filtering an output voltage to produce a relatively constant DC output voltage. FIG. 1 illustrates an electrical system 10 including an LC circuit (inductor L1 and capacitor Cout) for filtering the output signal from a control circuit 12. The output voltage $V_{OUT}$ is used to drive a load represented by load resistor $R_L$. The filtered output voltage $V_{OUT}$ (node 14) is connected back to the control circuit 12 to form a feedback loop. The LC circuit has associated with it two poles, one pole associated with each circuit element. If the feedback control loop is not compensated, the LC circuit alone contributes an −180° phase shift to the system and loop instability results, causing the output voltage to oscillate.

A commonly employed compensation scheme for feedback loops is referred to as Type III compensation. The Type III compensation scheme shapes the profile of the gain with respect to frequency using two zeroes to give a phase boost of 180°. The phase boost therefore counteracts the effects of the underdamped resonance at the double pole of the output LC filter, thereby ensuring closed loop stability. For example, two zeros can be inserted at the exact frequency of the LC double pole where the frequency is given as:

$$f_z = f_{p(LC)} = (2\pi \cdot \sqrt{L1 \cdot Cout})^{-1}.$$

Conventional voltage mode switching regulators use an inductor-capacitor (LC) network at the voltage output terminal for filtering the switching output voltage to produce a relatively constant regulated DC output voltage. FIG. 2 is a schematic diagram of a conventional switching regulator including an LC circuit. Referring to FIG. 2, switching regulator 20 receives an input voltage Vin (node 22) and generates a switching output voltage $V_{SW}$ at an output node 18 which is coupled to LC circuit 11 for providing a regulated output voltage $V_{OUT}$ at node 14. The regulated output voltage $V_{OUT}$ is coupled back to the control circuitry of switching regulator 20 at a feedback (FB) node 24 for forming a feedback control loop. In the present illustration, the control circuitry of switching regulator 20 includes an error amplifier 28, a control circuit 32, and a driver circuit 34. Driver circuit 34 drives power switches M1 and M2 alternately to charge the common node 18 to the input voltage Vin or to discharge common node 18 to the ground voltage, thereby generating the switching output voltage $V_{SW}$ at common node 18 between the two power switches.

The LC circuit 11 has associated with it two poles, one pole associated with each circuit element. If the feedback control loop is not compensated, LC circuit 11 alone contributes an −180° phase shift to the system and loop instability results, causing the output voltage to oscillate. Because virtually every switching regulator uses an LC filter circuit to filter the switching output voltage $V_{SW}$, compensation must be provided in the feedback control loop of the switching regulator to compensate for the effect of the two poles introduced by the LC circuit.

FIG. 2 illustrates one approach for providing compensation in the feedback control loop of switching regulator 20. Referring to FIG. 2, the output voltage $V_{OUT}$ is coupled to the feedback (FB) node 24 through a parallel combination of a capacitor $C_{zero}$ and a resistor $R_{IN}$. In some applications, a voltage divider may be provided to step down the output voltage $V_{OUT}$ before the output voltage is fed back to the FB terminal. In the present embodiment, resistor R2 is used to step down the feed-back output voltage. The feedback voltage $V_{FB}$ (node 24) is connected to one input terminal of error amplifier 28 which compares the feedback voltage $V_{FB}$ to a reference voltage $V_{REF}$ (node 26). The feedback voltage $V_{FB}$ is also coupled through a series combination of a resistor $R_f$ and a capacitor $C_{pole}$ to the output terminal (node 30) of error amplifier 28. The error output voltage $V_{ERR}$ (node 30) of error amplifier 28 is coupled to control circuit 32 to generate the appropriate control signals which are coupled to driver circuit 34 for driving power switches M1 and M2.

The operation of the feedback control loop in switching regulator 20 is well known in the art. The output voltage $V_{OUT}$ is fed back as feedback voltage $V_{FB}$ to error amplifier 28 which compares the feedback voltage $V_{FB}$ to a reference voltage $V_{REF}$. Error amplifier 28 generates an error output signal $V_{ERR}$ indicative of the difference between voltage $V_{FB}$ and reference voltage $V_{REF}$. The error output signal $V_{ERR}$ is then coupled to control circuit 32 to generate the drive signals for power switches M1 and M2. The feedback control loop of switching regulator 20 operates to regulate the output voltage $V_{OUT}$ based on the error output of error amplifier 28 so that voltage $V_{FB}$ equals voltage $V_{REF}$.

In the switching regulator of FIG. 2, capacitor $C_{zero}$ is connected in parallel to resistor $R_{IN}$ and capacitor $C_{pole}$ is connected in series with resistor $R_f$ to provide compensation to the feedback loop. Capacitor $C_{pole}$ and resistor $R_f$ introduce a first zero in the feedback while capacitor $C_{zero}$ and resistor $R_{IN}$ introduces a second zero-pole pair in the feedback loop. The locations (or frequencies) of the first and second zeroes are determined by the respective resistance and the capacitance values of resistors $R_{IN}$, $R_f$ and capacitors $C_{zero}$ and $C_{pole}$.

The Type III compensation scheme for a switching regulator can be provided on-chip or off-chip. When external compensation (off-chip) is used, it is often very difficult for users of the switching regulator to determine the optimal capacitance and resistance values for capacitors $C_{pole}$ and $C_{zero}$ and resistors $R_{IN}$ and $R_f$ in order to support a large range of output LC filter circuit values. The transfer function to determine the capacitance and resistance values is often very complex. Also, using external resistors and capacitors add cost and consume valuable board space. In addition, although the capacitance value is usually constant, the inductance value of the inductor in the LC circuit can decrease if the current in the switching regulator is high enough to drive the inductor into saturation. Furthermore, inductance value can change over temperature or current. Variations of the inductance value of inductor L1 in the LC circuit can change the location of the pole so that even an externally compensated system can be driven to instability. Thus, limitations have to be imposed on the types of inductor that can be used to ensure that the inductance values are well controlled. Alternately, the system has to be overcompensated to account for the worst case inductance values.

On the other hand, when internal compensation (on-chip) is used, the range of output LC filter values is limited because the locations of the zero compensation are fixed by the on-chip compensation circuit. The LC filter circuit must conform to the limited range of inductance and capacitance values or the feedback loop will become unstable.

Thus, it is desirable to provide a compensation scheme for an LC circuit in a feedback loop that is capable of providing effective pole cancellation and zero compensation while being simple and flexible to implement.

SUMMARY OF THE INVENTION

According to one embodiment of the present invention, a method for providing adaptive compensation for an electrical circuit where the electrical circuit includes an inductor-capacitor network connected in a feedback loop being compensated by a first compensation capacitance value and a second compensation capacitance value defining the frequency locations of two compensation zeros in the feedback loop and where the inductor-capacitor network includes a first inductor and a first capacitor includes: measuring the inductance value of the first inductor; when the inductance value is greater than a first threshold value, increasing the first and second compensation capacitance values so that the frequency locations of the two compensation zeros are adjusted for compensating the poles introduced by the first inductor and the first capacitor; and when the inductance value is less than the first threshold value, decreasing the first and second compensation capacitance values so that the frequency locations of the two compensation zeros are adjusted for compensating the poles introduced by the first inductor and the first capacitor.

The present invention is better understood upon consideration of the detailed description below and the accompanying drawings.

BRIEF DESCRIPTION OF THE DRAWINGS

FIG. 7 is a circuit diagram of an inductance value calculator which can be used in the adaptive compensation scheme according to one embodiment of the present invention.

FIGS. 8A and 8B are waveforms illustrating the logical states of inductance value calculator of FIG. 7 for high and low inductance values.

DETAILED DESCRIPTION OF THE PREFERRED EMBODIMENTS

In accordance with the principles of the present invention, an electrical circuit including an inductor-capacitor (LC) filter circuit as a filter circuit connected in a feedback loop incorporates an adaptive compensation circuit providing compensation based on the inductance value of the LC circuit. More specifically, the adaptive compensation circuit senses the inductance value of the LC circuit and adjusts the compensation capacitance accordingly to provide effective pole cancellation and zero compensation for feedback loop stability.

Figure 1:
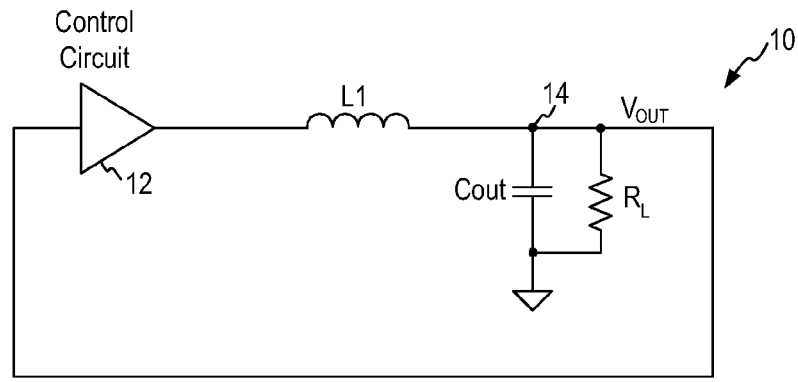
FIG. 1 is a representative circuit diagram of a conventional electrical circuit including an LC circuit in a feedback loop.
Figure 2:
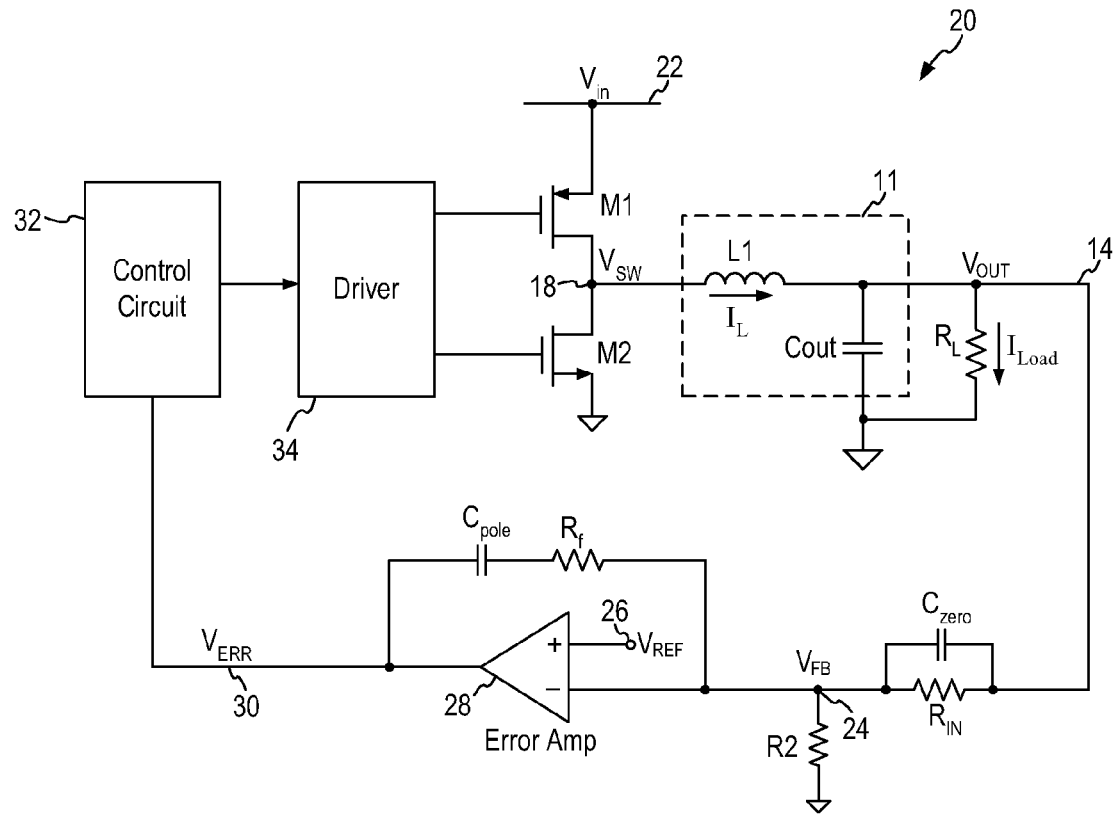
FIG. 2 is a circuit diagram of a conventional switching regulator including an LC circuit and connected in a feedback loop.
Figure 3:
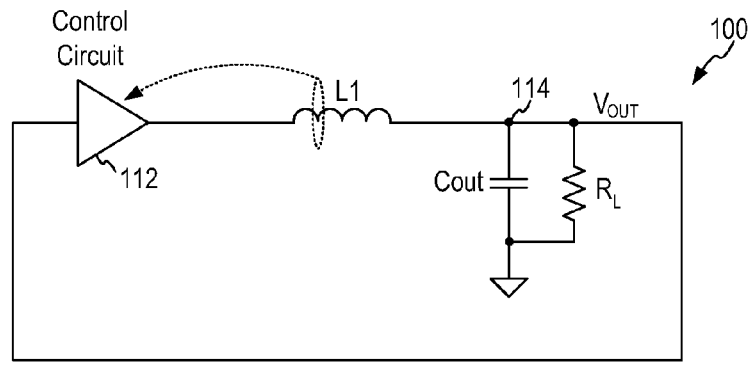
FIG. 3 is a representative circuit diagram of an electrical circuit including an LC circuit in a feedback loop and incorporating the adaptive compensation scheme according to one embodiment of the present invention.

FIG. 3 is a representative circuit diagram of an electrical circuit including an LC circuit in a feedback loop and incorporating the adaptive compensation scheme according to one embodiment of the present invention. Referring to FIG. 3, an electrical circuit 100 includes an LC circuit (inductor L1 and capacitor Cout) for filtering the output signal from a control circuit 112. The output voltage $V_{OUT}$ is used to drive a load represented by load resistor $R_L$. The filtered output voltage $V_{OUT}$ (node 114) is connected back to the control circuit 112 to form a feedback loop. The LC circuit has associated with it two poles, one pole associated with each circuit element. In accordance with the adaptive compensation scheme of the present invention, the inductance value of inductor L1 is sensed and control circuit 112 implements a transfer function that is dependent on the inductance value. In this manner, the compensation provided for the double pole of the LC circuit is no longer a fixed frequency response but rather is optimized to the inductance value of the LC circuit. Furthermore, the compensation provided for the double pole of the LC circuit varies with changing inductance values so that optimal compensation is always employed.

Figure 4:
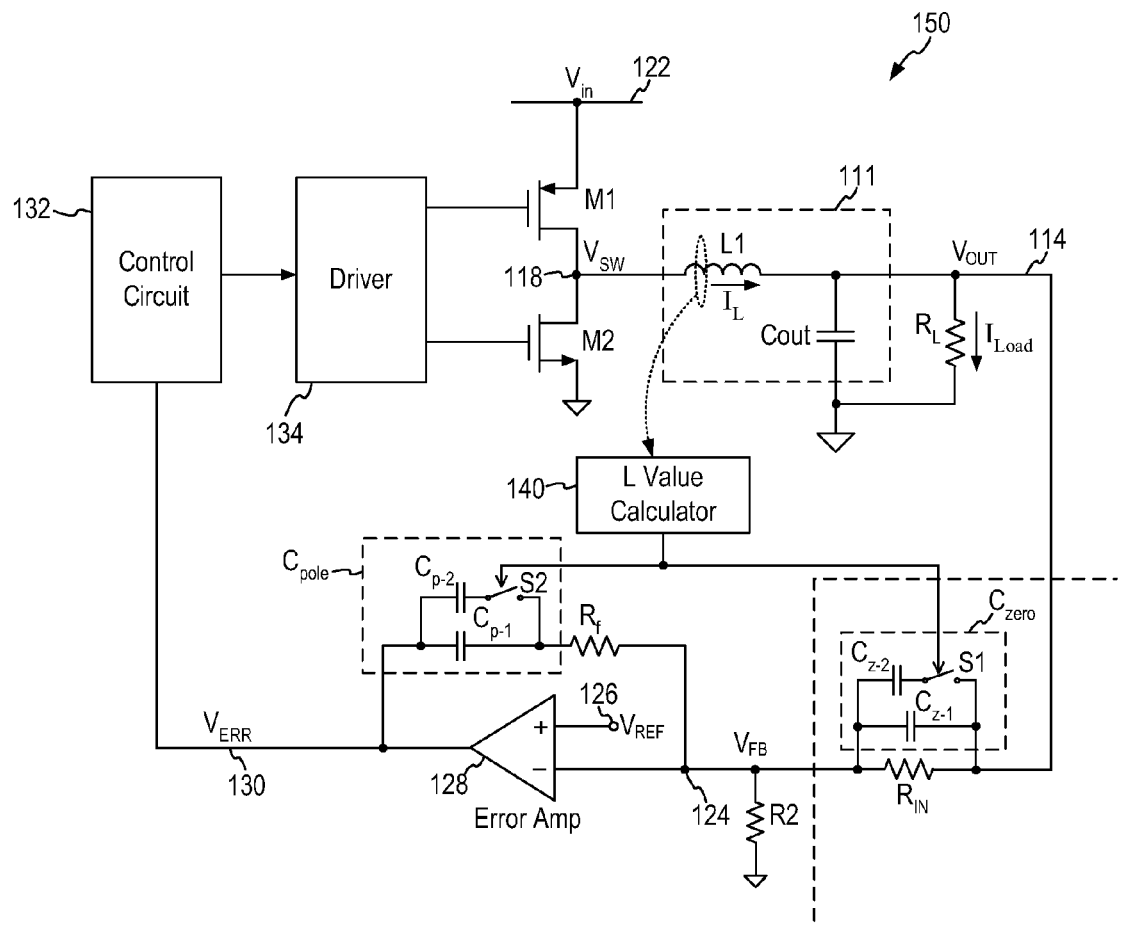
FIG. 4 is a circuit diagram of a switching regulator including an LC circuit and connected in a feedback loop and incorporating the adaptive compensation scheme according to one embodiment of the present invention.

FIG. 4 is a circuit diagram of a switching regulator including an LC circuit and connected in a feedback loop and incorporating the adaptive compensation scheme according to one embodiment of the present invention. In the embodiment shown in FIG. 4, a switching regulator 150 implements a 1-bit adaptive compensation scheme where the compensation capacitance values are selected from one of two capacitance values depending on the sensed inductance value of the LC circuit. If the inductance of the inductor L1 in the LC circuit is larger than a certain threshold value, additional compensation capacitance is added to cause the compensation zeros to be at lower frequencies. If the inductance of the inductor L1 in the LC circuit drops below the threshold value, only the nominal compensation capacitance is used to increase the frequency of the compensation zeros.

Referring to FIG. 4, switching regulator 150 receives an input voltage Vin (node 122) and generates a switching output voltage $V_{SW}$ at an output node 118 which is coupled to LC circuit 111 for providing a regulated output voltage $V_{OUT}$ at node 114. The regulated output voltage $V_{OUT}$ is coupled back to the control circuitry of switching regulator 150 at a feedback (FB) node 124 for forming a feedback control loop. In the present illustration, the control circuitry of switching regulator 150 includes an error amplifier 128, a control circuit 132, and a driver circuit 134. Driver circuit 134 drives power switches M1 and M2 alternately to charge the common node 118 toward the input voltage Vin or to discharge common node 118 toward the ground voltage, thereby generating the switching output voltage $V_{SW}$ at common node 118 between the two power switches.

To form the feedback control loop, the output voltage $V_{OUT}$ is coupled to the feedback (FB) node 124 through a parallel combination of a first set of compensation capacitors ($C_{z-1}$ and $C_{z-2}$) and a resistor $R_{IN}$. In some applications, a voltage divider may be provided to step down the output voltage $V_{OUT}$ before the output voltage is fed back to the FB terminal. In the present embodiment, resistor R2 is used to step down the feed-back output voltage. The feedback voltage $V_{FB}$ (node 124) is connected to one input terminal of error amplifier 128 which compares the feedback voltage $V_{FB}$ to a reference voltage $V_{REF}$ (node 126). The feedback voltage $V_{FB}$ is also coupled through a series combination of a resistor $R_f$ and a second set of compensation capacitors ($C_{p-1}$ and $C_{p-2}$) to the output terminal (node 130) of error amplifier 28. The error output voltage $V_{ERR}$ (node 130) of error amplifier 28 is coupled to control circuit 132 to generate the appropriate control signals which are coupled to driver circuit 134 for driving power switches M1 and M2.

According to one embodiment of the present invention, switching regulator 150 incorporates a 1-bit adaptive compensation circuit where the inductance value of inductor L1 is sensed and the sensed inductance is used to adjust the value of the compensation capacitance being applied. More specifically, the adaptive compensation circuit in switching regulator 150 includes an inductance (L) value calculator 140 for sensing the inductance of inductor L1 and a plurality of switches S1, S2 for switching in or switching out additional compensation capacitances. In the present embodiment, the compensation capacitance $C_{zero}$ includes a capacitor $C_{z-1}$ providing the nominal compensation capacitance which is always connected to the feedback loop and a capacitor $C_{z-2}$ providing the additional compensation capacitance which is switchably connected to the feedback loop through switch S1. Furthermore, the compensation capacitance $C_{pole}$ includes a capacitor $C_{p-1}$ providing the nominal compensation capacitance which is always connected to the feedback loop and a capacitor $C_{p-2}$ providing the additional compensation capacitance which is switchably connected to the feedback loop through switch S2. Switches S1 and S2 are controlled by an output signal of inductance value calculator 140 and are turned on (close) or turned off (open) depending on the measured inductance value of inductor L1.

In operation, inductance value calculator 140 senses the inductance of inductor L1 and generates the output signal having a first state indicating that the inductance is greater than a threshold value and a second state indicating that the inductance is less than the threshold value. If the inductance of inductor L1 is larger than the threshold value, switches S1 and S2 are turned on (closed) and the additional compensation capacitors are added to the respective nominal compensation capacitors in parallel. That is, when switch S1 is closed, capacitor $C_{z-2}$ is connected in parallel with capacitor $C_{z-1}$; and when switch S2 is closed, capacitor $C_{p-2}$ is connected in parallel with capacitor $C_{p-1}$. The compensation capacitance $C_{zero}$ and the compensation capacitance $C_{pole}$ are therefore increased and the compensation zeros are adjusted to lower frequencies.

On the other hand, if the inductance of inductor L1 is less than the threshold value, switches S1 and S2 are turned off (open) and the additional compensation capacitors are disconnected from the feedback loop. That is, when switch S1 is open, capacitor $C_{z-2}$ is disconnected from capacitor $C_{z-1}$; and when switch S2 is open, capacitor $C_{p-2}$ is disconnected from capacitor $C_{p-1}$. The compensation capacitance $C_{zero}$ and the compensation capacitance $C_{pole}$ therefore return to their nominal values and the compensation zeros are adjusted to higher frequencies.

In this manner, the adaptive compensation circuit sets the locations of the zeros at the optimal values depending on the inductance value of inductor L. Thus, in switching regulator 150, if inductor L1 is replaced with an inductor of a different inductance value or if inductor L1 goes into saturation so that its inductance value decreases, the compensation capacitances will adjust accordingly to set the location of the compensation zeros at the optimal locations. The adaptive compensation circuit ensures operational stability over a wider range of inductance values.

Figure 5:
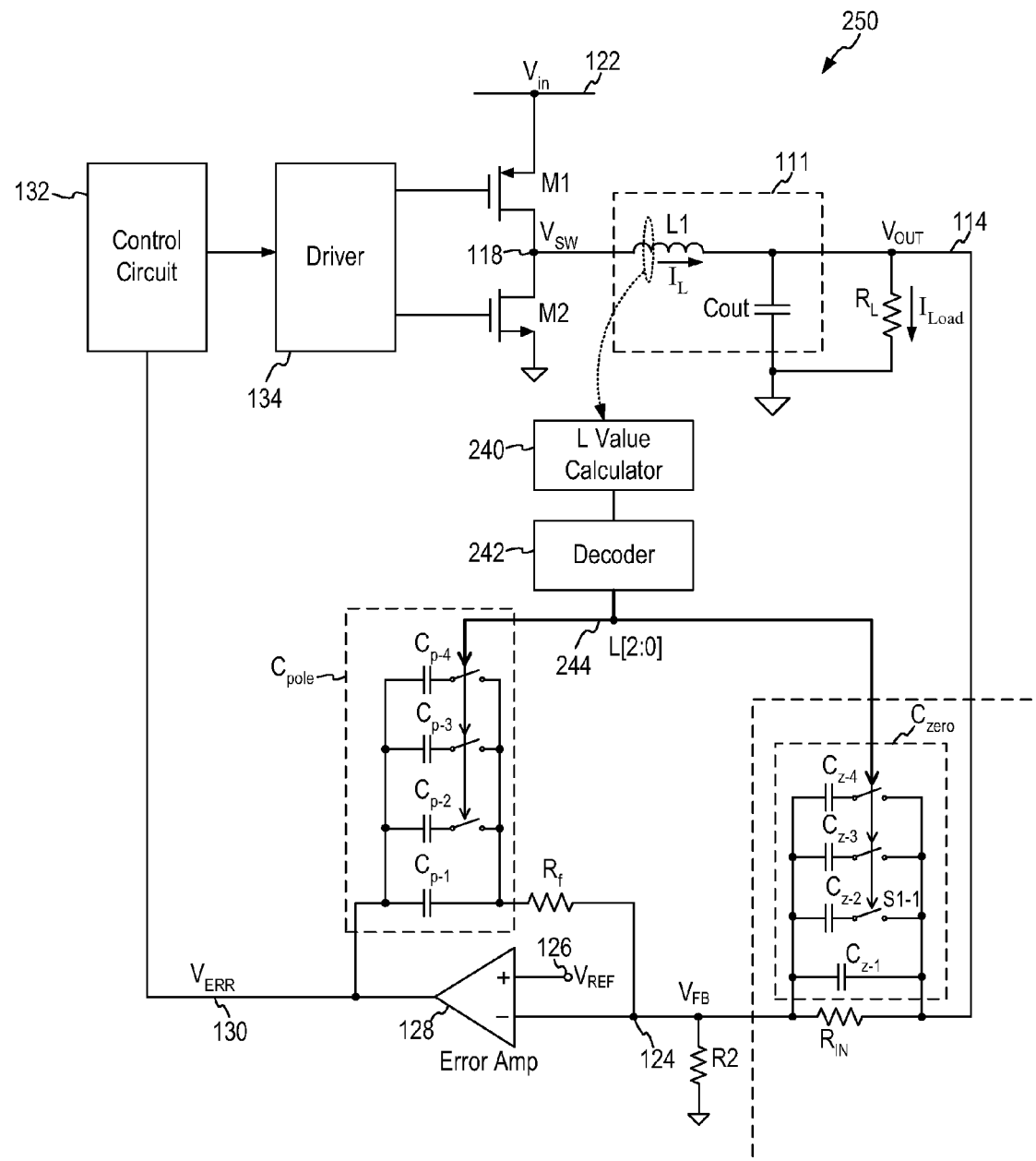
FIG. 5 is a circuit diagram of a switching regulator including an LC circuit and connected in a feedback loop and incorporating the adaptive compensation scheme according to an alternate embodiment of the present invention.

In switching regulator 150, a 1-bit adaptive compensation scheme is applied. In other embodiments, a more precise compensation zero-to-inductor correlation can be accomplished by using multiple switches for introducing additional compensation capacitances in incremental amount for each compensation capacitor. FIG. 5 is a circuit diagram of a switching regulator including an LC circuit and connected in a feedback loop and incorporating the adaptive compensation scheme according to an alternate embodiment of the present invention. In the embodiment shown in FIG. 5, a switching regulator 250 implements a 3-bit adaptive compensation scheme where three switches are used to adjust the compensation capacitance values in incremental amount depending on the sensed inductance value of the LC circuit. Like elements in FIGS. 4 and 5 are given like reference numerals and will not be further described.

In the present embodiment, switching regulator 250 incorporates a 3-bit adaptive compensation circuit where each of nominal compensation capacitors $C_{z-1}$ and $C_{p-1}$ is provided with three additional compensation capacitors, of the same or different capacitance values. The additional compensation capacitors are switchably connected to their respective nominal compensation capacitors to form the compensation capacitances $C_{zero}$ and $C_{pole}$. The adaptive compensation circuit in switching regulator 250 includes an inductance (L) value calculator 240 for sensing the inductance of inductor L1 and generating a measured inductance value. The measured inductance value is coupled to a decoder 242 to be converted a multi-bit inductance indicator L[2:0]. In the present embodiment, the inductance indicator L[2:0] has 3 bits and is coupled to drive two sets of three switches for introducing additional compensation capacitances.

More specifically, capacitors $C_{z-2}$, $C_{z-3}$, and $C_{z-4}$ are switchably connected to capacitor $C_{z-1}$ through respective switches S1-1, S1-2 and S1-3. Similarly, capacitors $C_{p-2}$, $C_{p-3}$, and $C_{p-4}$ are switchably connected to capacitor $C_{p-1}$ through respective switches S2-1, S2-2 and S2-3. Switches S1-1, S1-2 and S1-3 and S2-1, S2-2 and S2-3 are controlled by inductance indicator L[2:0] to open or close depending on the measured inductance value of inductor L1. Accordingly, an incremental amount of compensation capacitance can be added or removed from the feedback loop depending on the variation in the inductance value of inductor L1. The locations of the compensation zeros can thus be more precisely placed. The 3-bit adaptive compensation circuit in switching regulator 250 thus provides more precise compensation adjustments.

The adaptive compensation scheme of the present invention provides many advantages. When the frequency location of the compensation zeros are fixed, any changes in the inductance values leading to changes in the double pole location can lead to a degradation of the phase margin and the circuit becomes unstable at the extreme end of the inductance range. However, when the adaptive compensation scheme of the present invention is applied, the frequency location of the compensation zeros is adjusted based on the changing inductance values so that the circuit is capable of retaining positive phase margin over a wider range of inductances values.

Figure 6A:
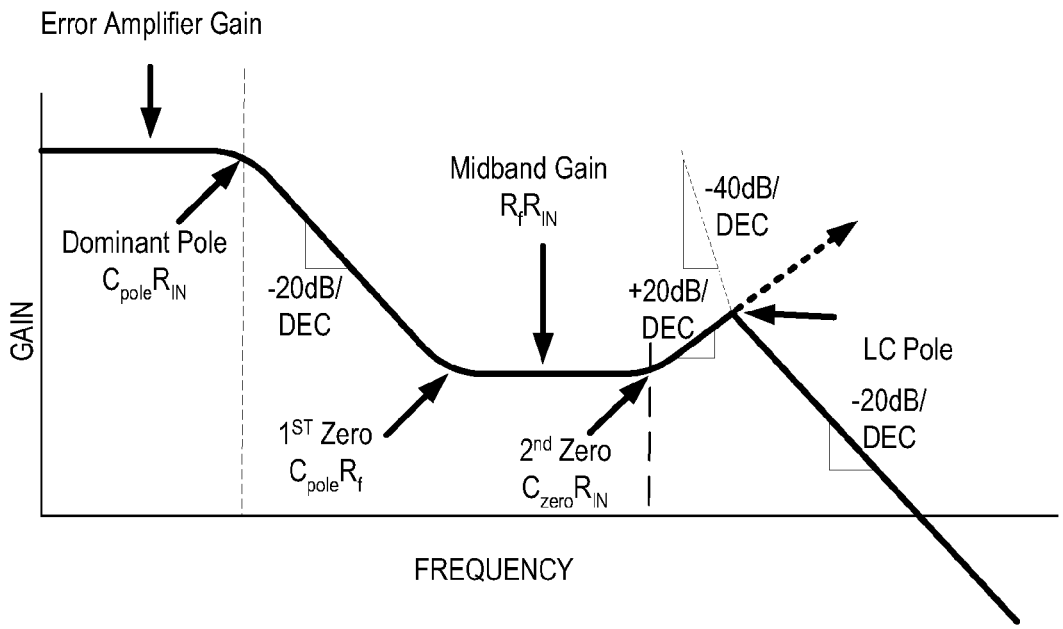
FIGS. 6A and 6B are plots of the loop gain magnitude vs. frequency in log scale for the switching regulators in FIGS. 4 and 5 illustrating the operation of the adaptive compensation scheme according to one embodiment of the present invention.

FIG. 6A is a plot of the loop gain magnitude vs. frequency in log scale for the switching regulators of FIGS. 4 and 5. The low frequency loop gain is first reduced by a dominant pole associated with capacitor $C_{pole}$ and resistor $R_{IN}$. The gain loss is modified by the first zero also associated with capacitor $C_{pole}$ and resistor $R_f$ to form a midband gain region. Then, at high frequency, the second zero associated with capacitor $C_{zero}$ and resistor $R_{IN}$ becomes effective to increase the gain until the effect of the double-pole in the LC filter circuit causes a large loss in the loop gain. The operation of the compensation capacitors $C_{pole}$ and $C_{zero}$ ensures that the phase shift of the feedback loop is less than 180° near unity gain.

Figure 6B:
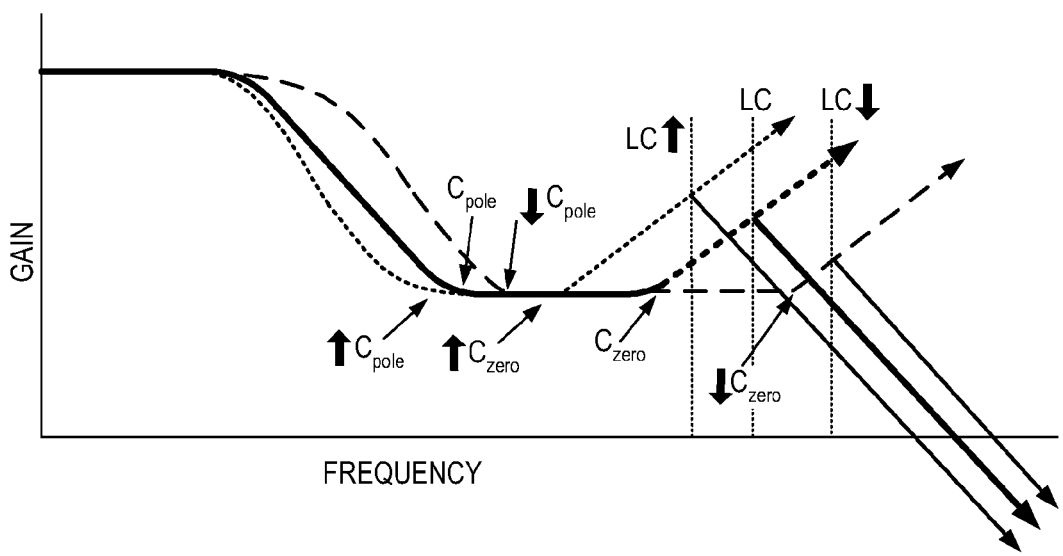

FIG. 6B is a plot of the loop gain magnitude vs. frequency in log scale for the switching regulators of FIGS. 4 and 5 illustrating the operation of the adaptive compensation scheme according to one embodiment of the present invention. The loop gain vs. frequency plot of FIG. 6B is similar to that of FIG. 6A in that the low frequency loop gain is first reduced by a dominant pole associated with capacitor $C_{pole}$ and resistor $R_{IN}$ and then the gain loss is modified by the first zero also associated with capacitor $C_{pole}$ and resistor $R_f$ to form a midband gain region. Then, at high frequency, the second zero associated with capacitor $C_{zero}$ and resistor $R_{IN}$ becomes effective to increase the gain until the effect of the double-pole in the LC filter circuit causes a large loss in the loop gain. The locations of the first zero associated with the compensation capacitor $C_{pole}$ and the second zero associated with the compensation capacitor $C_{zero}$ are modified by changing the capacitance values through the adaptive compensation circuit. The capacitance values of compensation capacitors $C_{pole}$ and $C_{zero}$ are varied based on the inductance value of the inductor in the LC circuit so that the locations of the two compensation zeros are modified to accommodate different inductor values used for the LC filter circuit. For instance, when larger inductance values are used for the LC filter circuit, larger compensation capacitances are used for capacitors $C_{pole}$ and $C_{zero}$ to decrease the frequencies of the first and second compensation zeros. On the other hand, when smaller inductance values are used for the LC filter circuit, smaller compensation capacitances are used for capacitors $C_{pole}$ and $C_{zero}$ to increase the frequencies of the first and second compensation zeros accordingly so that close loop stability is maintained. Thus, effective compensation of the switching regulator for a wide range of inductor values used for the LC filter circuit is realized.

The inductance value calculator for sensing and measuring the inductance value of inductor L1 can be implemented using inductance measurement circuits, presently known or to be developed. FIG. 7 is a circuit diagram of an inductance value calculator which can be used in the adaptive compensation scheme according to one embodiment of the present invention. In the present illustration, the top-side power switch M1 is implemented with a PMOS transistor. Inductance value calculator 140 includes a PMOS transistor M11 for sensing the current flowing through the top power switch M1. In one embodiment, transistor M11 is 1/M times the size of power switch M1 for sensing 1/M times the current. The current sensed by transistor M11 is converted into a voltage through a resistor $R_0$. The converted voltage $V_{isense}$ (node 302) is then differentiated by the high pass filter formed by resistor $R_1$ and capacitor $C_{11}$. More specifically, the voltage $V_{isense}$ is AC coupled through capacitor C11. The voltage at $V_{isense}$ is given as:

$$V_{isense}=(I_L/M)*R_0.$$

The differentiated voltage $V_{diff}$ (node 304) is given as:

$$V_{diff}=R_1*C_1*dV_{isense}/dt;$$

$$V_{diff}=(R_0*R_1*C_1/M)*(dI_L/dt).$$

Since the inductance L of inductor L1 is equal to $(V_{SW}-V_{OUT})/(dI_L/dt)$, $$dI_L/dt=(V_{SW}-V_{OUT})/L;$$

$$V_{diff}=(V_{SW}-V_{OUT})*(R_0*R_1*C_1)/(L*M);$$

$$L=(V_{SW}-V_{OUT})*(R_0*R_1*C_1)/(V_{diff}*M).$$

Next, define $L_0$ as the threshold inductance value such that the adaptive compensation circuit will use larger compensation capacitors when $L>L_0$ and smaller compensation capacitors when $L<L_0$. This means that the larger capacitance values will be used when $L>L_0$, or $$V_{diff}<(V_{SW}-V_{OUT})*(R_0*R_1*C_1)/(L_0*M). \quad \text{Eq. (1)}$$

Inductance value calculator 140 includes a comparator 308 for comparing the differentiated voltage $V_{diff}$ to the threshold voltage value defined by equation (1) above. The output signal C_out (node 310) of comparator 308 is coupled to the data input terminal of a D-flip-flop 314. Since the current through the power switch M1 is only being sensed on the top switch, the inductance value calculator 140 should only sample the comparator output each cycle and ignore the data from the periods of time when the top switch M1 is turned off. Thus, D-FF 314 receives the switch off signal (node 312) as the clock signal. The switch off (swOFF) signal is asserted (low to high) at the end of each switch ON cycle. Thus, at the end of each switch ON cycle, the comparator output signal C_out is sampled and the compensation capacitances are set on a cycle-by-cycle basis. D-FF 314 generates a High-L output signal (node 316) as the inductance indicator signal. The High-L output signal has a first logical state when the sensed capacitance is greater than the threshold $L_0$ and a second logical state when the sensed capacitance is less than the threshold $L_0$.

FIGS. 8A and 8B are waveforms illustrating the logical states of inductance value calculator of FIG. 7 for high and low inductance values. Referring to FIG. 8A, when the power switch M1 is turned on, the switching output voltage $V_{SW}$ is driven to voltage Vin and the differentiated voltage $V_{diff}$ is charged up but remains less than the threshold voltage level indicated by the dot-dash line. The comparator output signal C_out is at a logical high state. At the end of the switch on cycle, when swON goes low and swOFF goes high, D-FF 314 samples the value of signal C_out and asserts the inductance indicator High-L since C_out has a logical high value. In this manner, inductance indicator High-L indicates a measured inductance L being greater than the threshold value $L_0$ ($L>L_0$).

Referring to FIG. 8B, when the power switch M1 is turned on, the switching output voltage $V_{SW}$ is driven to voltage Vin and the differentiated voltage $V_{diff}$ is charged up and becomes greater than the threshold voltage level indicated by the dot-dash line. When voltage $V_{diff}$ crosses the threshold, the comparator output signal C_out transitions to a logical low state. At the end of the switch on cycle, when swON goes low and swOFF goes high, D-FF 314 samples the value of signal C_out and deasserts the inductance indicator High-L since C_out has a logical low value. In this manner, inductance indictor High-L indicates a measured inductance L being less than the threshold value $L_0$ ($L<L_0$). The inductance value calculator circuit 140 operates such that once the High-L value is set, the High-L signal will stay either high or low unless the inductance of inductor L1 changes.

Returning to FIGS. 4 and 5, switching regulators 150 and 250 can be constructed using integrated compensation capacitors $C_{zero}$ or using external compensation capacitors $C_{zero}$. When the compensation capacitors $C_{zero}$ are external to the switching regulator integrated circuit, the inductance indicator signal from the inductance value calculator 140 or from decoder 242 can be provided to switches coupled to the additional compensation capacitors to connect the one or more additional compensation capacitors to the nominal compensation capacitor $C_{z-1}$. The adaptive compensative scheme of the present invention can be implemented regardless of the level of integration of the compensation capacitors. Furthermore, the voltage divider for dividing down the output voltage $V_{OUT}$ can be external or internal to the switching regulator integrated circuit. The exact level of integration of the compensation capacitors, compensation resistors and voltage divider is not critical to the practice of the present invention.

The above detailed descriptions are provided to illustrate specific embodiments of the present invention and are not intended to be limiting. Numerous modifications and variations within the scope of the present invention are possible. The present invention is defined by the appended claims.

We claim:

1. A method for providing adaptive compensation for an electrical circuit including an inductor-capacitor network connected in a feedback loop being compensated by a first compensation capacitance value and a second compensation capacitance value defining the frequency locations of two compensation zeros in the feedback loop, the inductor-capacitor network including a first inductor and a first capacitor, the method comprising:
    measuring the inductance value of the first inductor;
    when the inductance value is greater than a first threshold value, increasing the first and second compensation capacitance values so that the frequency locations of the two compensation zeros are adjusted for compensating the poles introduced by the first inductor and the first capacitor; and
    when the inductance value is less than the first threshold value, decreasing the first and second compensation capacitance values so that the frequency locations of the two compensation zeros are adjusted for compensating the poles introduced by the first inductor and the first capacitor.

2. The method of claim 1, wherein the first and second compensation capacitance values have respective first and second nominal values and decreasing the first and second compensation capacitance values comprises using the first and second nominal values as the first and second compensation capacitance values.

3. The method of claim 1, wherein increasing the first and second compensation capacitance values adjusts the frequency locations of the two compensation zeros to lower frequencies.

4. The method of claim 1, wherein decreasing the first and second compensation capacitance values adjusts the frequency locations of the two compensation zeros to higher frequencies.

5. An adaptive compensation circuit for an electrical circuit including an inductance-capacitance network connected in a feedback loop being compensated by a first compensation capacitor having a first nominal capacitance value and a second compensation capacitor having a second nominal capacitance value defining the frequency locations of two compensation zeros in the feedback loop, the inductor-capacitor network including a first inductor and a first capacitor, the adaptive compensation circuit comprising:
    an inductance value calculation circuit for sensing and measuring the inductance value of the first inductor and generating an output signal indicative of the measured inductance value;
    a first set of one or more additional compensation capacitors switchably connected in parallel with the first compensation capacitor, the switchable connection being in response to the output signal of the inductance value calculation circuit; and
    a second set of one or more additional compensation capacitors switchably connected in parallel with the second compensation capacitor, the switchable connection being in response to the output signal of the inductance value calculation circuit,
    wherein when the measured inductance value is greater than a first threshold value, the switchable connections being closed to connect the one or more additional compensation capacitors to respective first and second compensation capacitors, thereby increasing the first and second compensation capacitance values so that the frequency locations of the two compensation zeros are adjusted for compensating the poles introduced by the first inductor and the first capacitor; and wherein when the measured inductance value is less than the first threshold value, the switchable connections being open, thereby retaining the first and second nominal compensation capacitance values so that the frequency locations of the two compensation zeros are adjusted for compensating the poles introduced by the first inductor and the first capacitor.

6. The circuit of claim 5, wherein increasing the first and second compensation capacitance values adjusts the frequency locations of the two compensation zeros to lower frequencies.

7. The circuit of claim 5, wherein retaining the first and second nominal compensation capacitance values adjusts the frequency locations of the two compensation zeros to lower frequencies.

8. The circuit of claim 5, wherein the output signal of the inductance value calculation circuit comprises a single-bit signal.

9. The circuit of claim 5, wherein the output signal of the inductance value calculation circuit comprises a multi-bit signal.

10. The circuit of claim 9, further comprising a decoder circuit receiving the output signal from the inductance value calculation circuit and generating the multi-bit signal.

11. The circuit of claim 5, wherein the electrical circuit comprises a switching regulator.

12. An adaptive compensation circuit for a switching regulator including an inductance-capacitance network connected in a feedback loop being compensated by a first compensation capacitor having a first nominal capacitance value and a second compensation capacitor having a second nominal capacitance value defining the frequency locations of two compensation zeros in the feedback loop, the inductor-capacitor network including a first inductor and a first capacitor, the adaptive compensation circuit comprising:

an inductance value calculation circuit for sensing and measuring the inductance value of the first inductor and generating an output signal indicative of the measured inductance value;

a first set of one or more additional compensation capacitors switchably connected in parallel with the first compensation capacitor, the switchable connection being in response to the output signal of the inductance value calculation circuit; and a second set of one or more additional compensation capacitors switchably connected in parallel with the second compensation capacitor, the switchable connection being in response to the output signal of the inductance value calculation circuit, wherein when the measured inductance value is greater than a first threshold value, the switchable connections being closed to connect the one or more additional compensation capacitors to respective first and second compensation capacitors, thereby increasing the first and second compensation capacitance values so that the frequency locations of the two compensation zeros are adjusted for compensating the poles introduced by the first inductor and the first capacitor; and wherein when the measured inductance value is less than the first threshold value, the switchable connections being open, thereby retaining the first and second nominal compensation capacitance values so that the frequency locations of the two compensation zeros are adjusted for compensating the poles introduced by the first inductor and the first capacitor.

13. The circuit of claim 12, wherein the first compensation capacitor is connected in parallel with a first compensation resistor, the first compensation capacitor and the first compensation resistor being connected between an output node of the inductor-capacitor circuit and a first input terminal of an error amplifier in the feedback loop of the switching regulator.

14. The circuit of claim 12, wherein the second compensation capacitor is connected in series with a second compensation resistor, the second compensation capacitor and the second compensation resistor being connected between the first input terminal and an output terminal of the error amplifier in the feedback loop of the switching regulator.

15. The circuit of claim 12, wherein increasing the first and second compensation capacitance values adjusts the frequency locations of the two compensation zeros to lower frequencies.

16. The circuit of claim 12, wherein retaining the first and second nominal compensation capacitance values adjusts the frequency locations of the two compensation zeros to lower frequencies.

17. The circuit of claim 12, wherein the output signal of the inductance value calculation circuit comprises a single-bit signal.

18. The circuit of claim 12, wherein the output signal of the inductance value calculation circuit comprises a multi-bit signal.

19. The circuit of claim 18, further comprising a decoder circuit receiving the output signal from the inductance value calculation circuit and generating the multi-bit signal.

* * * * *